(12) United States Patent
Turnquist et al.

(10) Patent No.: US 7,066,470 B2
(45) Date of Patent: *Jun. 27, 2006

(54) ACTIVE SEAL ASSEMBLY

(75) Inventors: Norman Arnold Turnquist, Sloansville, NY (US); Biao Fang, Clifton Park, NY (US); Osman Saim Dinc, Troy, NY (US); Hamid Reza Sarshar, The Woodlands, TX (US); Mehmet Demiroglu, Troy, NY (US); Mark Edward Burnett, Buskirk, NY (US); Frederick George Baily, Ballston Spa, NY (US); Mahmut Faruk Aksit, Istanbul (TR); Ahmad Safi, Karachi (PK); Richard Robert Larsen, Cookeville, TN (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/632,453

(22) Filed: Jul. 31, 2003

(65) Prior Publication Data

US 2004/0100035 A1     May 27, 2004

Related U.S. Application Data

(63) Continuation-in-part of application No. 09/683,254, filed on Dec. 5, 2001, now Pat. No. 6,786,487.

(51) Int. Cl.
*F16J 15/447* (2006.01)

(52) U.S. Cl. .................. 277/413; 277/355; 277/581
(58) Field of Classification Search ............... 277/413, 277/355, 580, 581, 578, 583
See application file for complete search history.

(56) References Cited

U.S. PATENT DOCUMENTS

| | | | | |
|---|---|---|---|---|
| 2,279,814 | A | * | 4/1942 | Dickinson ................ 277/416 |
| 2,279,863 | A | * | 4/1942 | Downer .................... 277/413 |
| 2,614,870 | A | * | 10/1952 | Ray ........................ 277/413 |
| 4,650,340 | A | * | 3/1987 | Krawczyk et al. ......... 366/220 |
| 5,603,510 | A | * | 2/1997 | Sanders ................... 277/413 |
| 6,435,514 | B1 | | 8/2002 | Aksit et al. |
| 6,502,823 | B1 | | 1/2003 | Turnquist et al. |
| 6,505,834 | B1 | * | 1/2003 | Dinc et al. ................ 277/355 |
| 6,572,115 | B1 | | 6/2003 | Sarshar et al. |
| 6,655,696 | B1 | * | 12/2003 | Fang et al. ............... 277/409 |
| 6,658,987 | B1 | * | 12/2003 | Oberhauser .............. 92/168 |
| 6,786,487 | B1 | * | 9/2004 | Dinc et al. ................ 277/355 |
| 6,840,519 | B1 | * | 1/2005 | Dinc et al. ................ 277/413 |
| 6,976,680 | B1 | * | 12/2005 | Uehara et al. ............ 277/355 |

* cited by examiner

*Primary Examiner*—Alison K. Pickard
(74) *Attorney, Agent, or Firm*—Fletcher Yoder

(57) ABSTRACT

A seal assembly includes an annular hanger having a supporting ledge. An arcuate seal segment includes an outer rail mounted on the ledge and supporting an inner seal. An arcuate carrier is mounted between the hanger and the rail, and includes a piston mounted in a bore. The bore is selectively pressurized to deploy the piston between the hanger and rail for temporarily retracting the seal segment from an adjacent rotor component.

35 Claims, 7 Drawing Sheets

ACTIVE SEAL ASSEMBLY

CROSS-REFERENCE TO RELATED APPLICATIONS

This is a continuation-in-part of U.S. application Ser. No. 09/683,254; filed 5 Dec. 2001, issued as U.S. Pat. No. 6,786,487 on 7 Sep. 2004, incorporated herein by reference.

BACKGROUND OF THE INVENTION

The present invention relates generally to gas and steam turbines, and, more specifically, to rotor seals therein.

In a gas turbine engine, air is pressurized in a multistage compressor and mixed with fuel in a combustor for generating hot combustion gases. The gases flow through turbine stages which extract energy therefrom for providing output power, such as powering an electrical generator joined thereto.

In a steam turbine, hot pressurized steam is separately formed in a steam boiler and channeled to steam turbine stages which extract energy therefrom for producing output power, such as powering an electrical generator.

Both types of turbine engines include rotors which are driven by the hot pressurized gases as they are expanded in the turbines thereof. The rotor includes various disks from which extend radially outwardly rotor blades or buckets which cooperate with stationary nozzles or diaphragms which include stator vanes between which gases are channeled. The rotor disks are interconnected by a rotor shaft suitably mounted in bearings.

In the gas turbine engine, the turbine rotor is also joined to the compressor rotor from which extend compressor rotor blades for pressurizing air during operation. And, in the steam turbine engine, the rotor disks are arranged in groups for defining a high pressure turbine, an intermediate pressure turbine, and a low pressure turbine all joined together in an exemplary configuration for powering the generator.

Each compression stage in the gas turbine, and each turbine stage in the gas and steam turbines requires suitable sealing to ensure that the pressurized gas or fluid is channeled between the stator vanes and rotor blades with minimal leakage for maximizing efficiency of operation. Since gas and steam turbine engines are typically manufactured for long useful lives, the seals therein should also be configured for long useful lives and reducing the need for maintenance or repair thereof which requires taking the corresponding machine off-line, and therefore interrupting power generation.

Various forms of seals are provided in these different types of machines and are located at various positions between stator and rotor components. The seals must be specifically configured for effective operation for various differential pressures depending upon their location in the machine. Low pressure seals are simpler in construction than high pressure seals, and the corresponding design requirements therefor are different. Differential pressures ranging from a few psi to a couple of thousand psi in these turbine machines are common, and require suitably configured seals for effective operation and longevity.

Two types of the many seals used in gas and steam turbine machines include the labyrinth seal and the brush seal. The labyrinth seal includes a sharp tooth, typically an array of teeth, which are disposed between stator and rotor components for providing a seal therebetween with a relatively small radial gap to reduce tooth damage during occasional tip rubs. A brush seal, having an array of bristles, is mounted between the stator and rotor components in a friction fit therebetween for providing sealing thereat.

Both types of seals are subject to eccentric orbiting of the rotor shaft during transient operations such as start up or shutdown of the turbine as the turbine rotors pass through various critical speeds or rotational frequencies. At steady-state operation at constant speed for powering the generator, the rotors rotate true with little if any deviation or orbiting from the rotor centerline axis.

Accordingly, transient orbiting of the rotor causes the rotor to deflect toward the surrounding seal and therefore introduce undesirable rubbing loads therein. In the case of the labyrinth teeth, tip rubs thereof will cause damage thereto and dull the otherwise sharp teeth which reduces the sealing efficiency thereof. And, tip rubs correspondingly increase the nominal radial clearance or gap between the teeth and the rotor and reduce the sealing effectiveness of the labyrinth seal.

Correspondingly, transient orbiting of the rotor within a brush seal can accelerate bristle wear, which can shorten useful seal life and reduce sealing effectiveness. Furthermore, the seals are also subject to differential thermal expansion and contraction movement with the rotor during transient operation which can also cause undesirable rubbing therebetween.

In view of the substantial number of rotor seals in the gas turbine engine or in the steam turbine machine, damage thereto during transient machine operation significantly affects the useful life thereof and sealing performance. The seals are found at various locations between stator components and the rotor shafts, between nozzles or diaphragms and the rotors, between blade or bucket tips and surrounding stator shrouds, and at various supporting bearings along the rotor shafts.

Accordingly, it is desired to provide an improved rotor seal assembly for gas and steam turbine machines for accommodating transient movement of the rotor shafts therein.

BRIEF DESCRIPTION OF THE INVENTION

A seal assembly includes an annular hanger having a supporting ledge. An arcuate seal segment includes an outer rail mounted on the ledge and supporting an inner seal. An arcuate carrier is mounted between the hanger and the rail, and includes a piston mounted in a bore. The bore is selectively pressurized to deploy the piston between the hanger and rail for temporarily retracting the seal segment from an adjacent rotor component.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
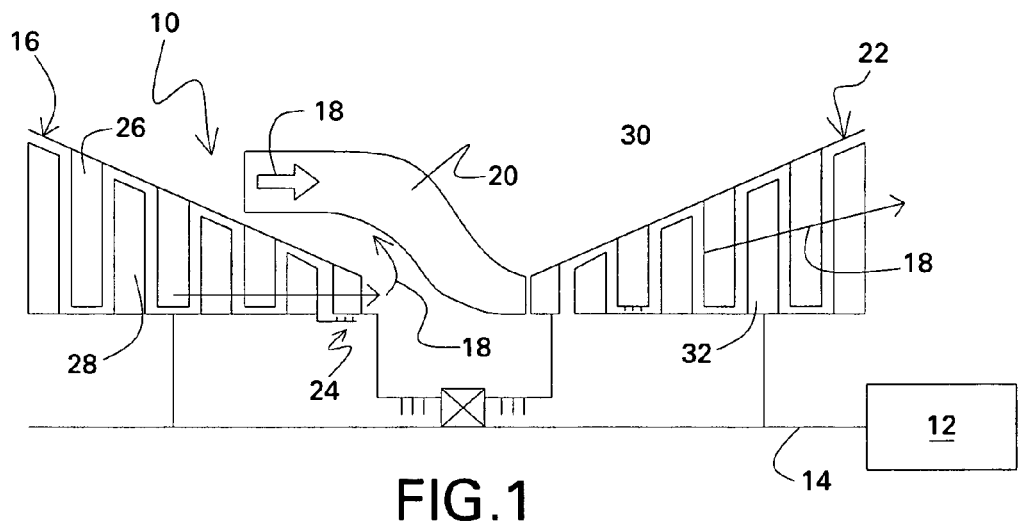
FIG. 1 is a schematic representation of an exemplary gas turbine engine configured for powering an electrical generator.

Illustrated schematically in FIG. 1 is a gas turbine engine 10 configured for powering an electrical generator 12 in an exemplary configuration. The engine includes a central rotor 14 suitably joined to the generator, and is axisymmetrical about the longitudinal or axial centerline axis passing through the rotor.

The engine includes a multistage axial compressor 16 configured for pressurizing air as a pressurized fluid 18 which is discharged into an annular combustor 20. In the combustor, fuel is mixed with the pressurized fluid 18 and ignited for generating hot combustion gases which retain their pressurized attribute. The combustion gases are discharged through a multistage gas turbine 22 which extracts energy therefrom for rotating the rotor 14 which powers the compressor and the generator in the exemplary configuration.

The gas turbine engine 10 illustrated in FIG. 1 may have any conventional configuration, and channels therethrough the pressurized fluid 18 initially as plain air, which is then mixed with fuel and ignited for generating the combustion gases which flow through the turbine stages. The pressurized fluid 18 therefore has various forms and pressures within the engine as it is channeled therethrough.

Accordingly, various seals or seal assemblies 24 are required at various locations in the engine between corresponding stator and rotor components. For example, the compressor 16 illustrated in FIG. 1 includes rows or stages of stator vanes 26 alternating with rows or stages of compressor rotor blades 28 which extend radially outwardly from a supporting rotor disk portion of the rotor 14. Various seals are provided between the vanes and compressor rotor, including the exemplary seal assembly 24 illustrated schematically at the discharge end of the compressor where air pressure is maximum.

The turbine 22 also includes rows or stages of stator vanes 30 alternating with rows or stages of turbine rotor blades 32 which extend outwardly from another portion of the common rotor 14. Again, various seal assemblies are provided between the turbine nozzle vanes 30 and the rotor.

The rotor 14 illustrated in FIG. 1 is mounted in various bearings, one of which is indicated schematically below the combustor, and also includes seal assemblies cooperating with the rotor.

Figure 2:
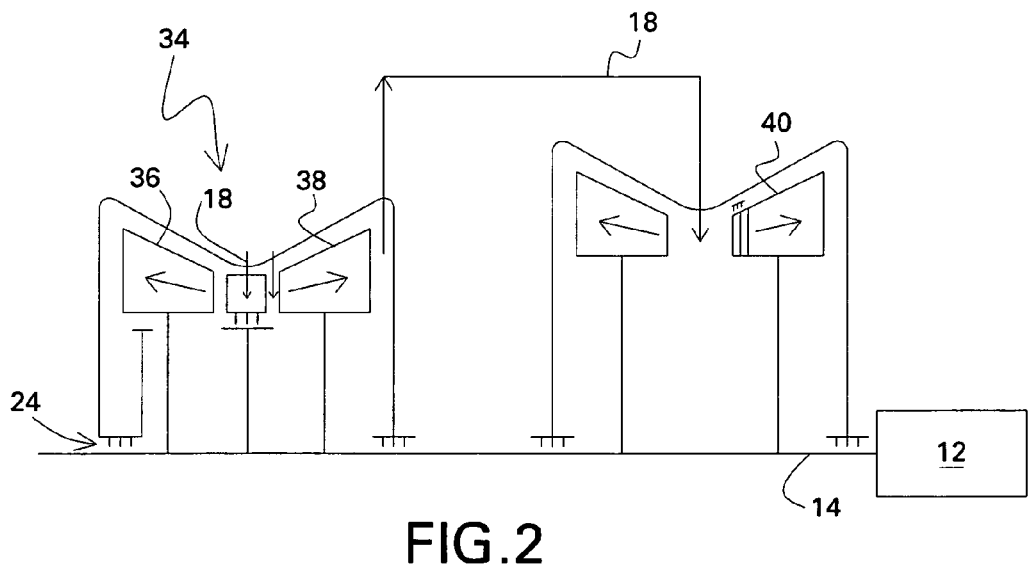
FIG. 2 is a schematic representation of an exemplary steam turbine machine configured for powering an electrical generator.

FIG. 2 illustrates an exemplary steam turbine machine 34 having a corresponding rotor 14 for powering the electrical generator 12 joined thereto. The steam turbine 34 is axisymmetrical about the longitudinal or axial centerline axis extending through the rotor 14, and may have any conventional configuration. For example, the steam turbine includes corresponding sections in the form of a high pressure turbine 36, intermediate pressure turbine 38, and low pressure turbine 40 all joined to the common rotor 14 for powering the generator 12. In the steam turbine configuration, the pressurized fluid 18 is hot, pressurized steam produced in a steam boiler and having corresponding pressure for use in the different turbine sections. The highest pressure steam provided to the high pressure turbine may have a pressure exceeding 3500 psi.

Like the gas turbine illustrated in FIG. 1, the steam turbine illustrated in FIG. 2 also includes various stator and rotor components requiring suitable sealing therebetween, and subject to corresponding differential pressure from relatively high in the high pressure turbine, to relatively low in the low pressure turbine, and at various locations along the common rotor 14. For example, the exhaust end of the high pressure turbine 36 includes an end packing or seal assembly 24 between the stator and rotor 14 which is subject to relatively low pressure during operation. Other locations in the steam turbine illustrated in FIG. 2 also include corresponding seal assemblies.

The various seal assemblies 24 illustrated schematically in FIGS. 1 and 2 by three small seal elements may be located at different positions and have otherwise conventional configurations suitably modified as described hereinbelow in accordance with the present invention. The seal assemblies may be located between portions of the corresponding rotor shafts and adjacent stator components. The seal assemblies may be located between the rotors and the stator vanes in the nozzles and diaphragms for example. And the seal assemblies may be located between the rotor blades of the steam turbine, also called turbine buckets, and the surrounding stator shrouds.

Figure 3:
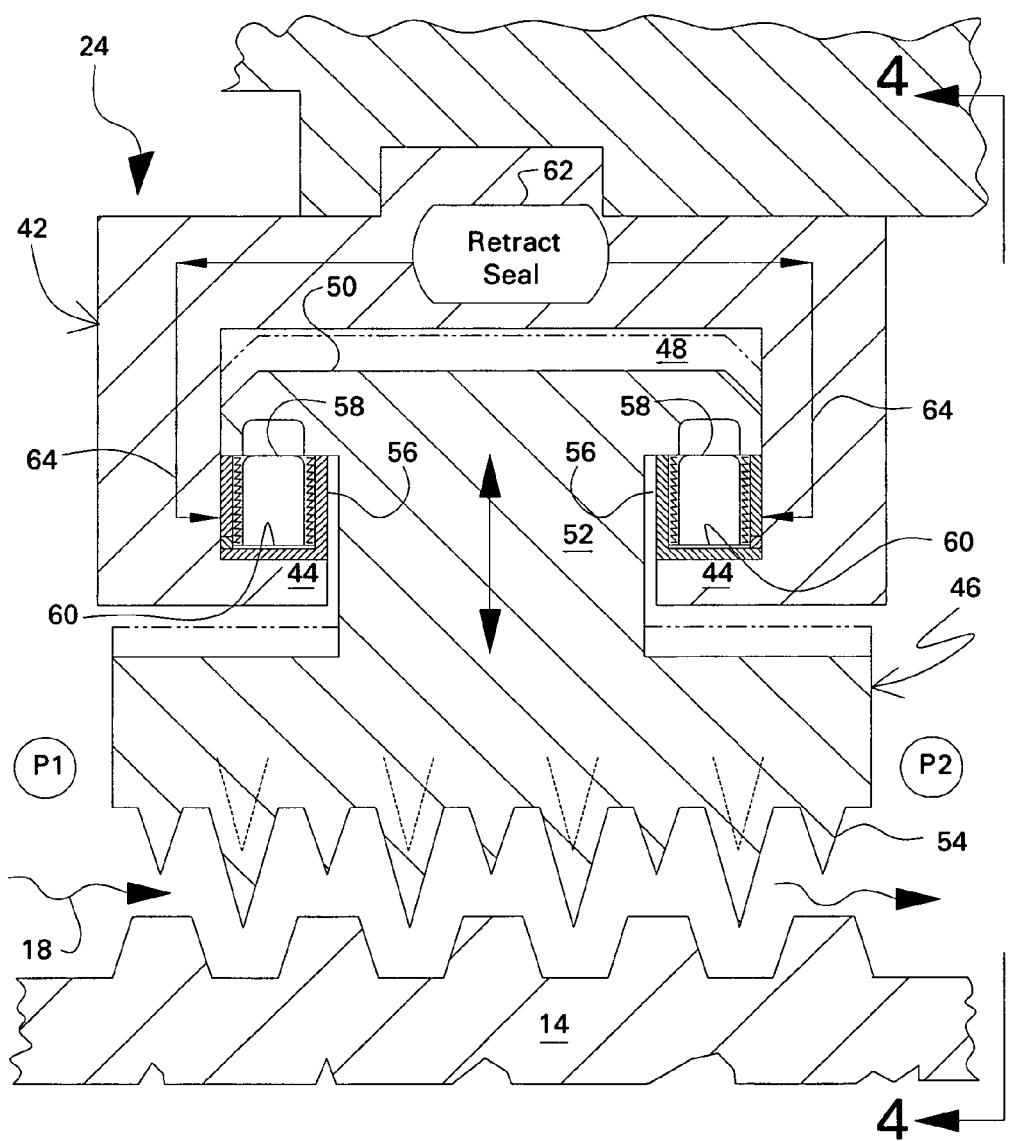
FIG. 3 is an elevational, axial sectional view through an exemplary active seal assembly in accordance with an exemplary embodiment for use in the gas turbine engine of FIG. 1 or in the steam turbine of FIG. 2.

FIG. 3 illustrates schematically an exemplary embodiment of the seal assembly 24 which may be suitably configured for use where desired in either the gas turbine engine 10 of FIG. 1 or the steam turbine machine 34 of FIG. 2 for sealing the corresponding pressurized fluid 18 therein between corresponding stator components and portions of the rotor 14. The rotor 14 may include the shaft portion thereof, rotor disks thereon, or the bucket tips thereof, for example.

As shown in FIG. 3, the seal assembly includes an annular supporting hanger 42 which may have any conventional form for use in gas or steam turbines, for example, yet is suitably modified in accordance with the present invention for providing an active seal. More specifically, the hanger 42 includes a supporting hook or ledge 44 on which is mounted a plurality of arcuate seal segments 46.

In the exemplary embodiment illustrated in FIG. 3, the hanger 42 includes a first or forward ledge 44 on one side spaced axially from a second or aft ledge 44 on an opposite side to define a dovetail channel or groove 48. The seal segment 46 includes a radially outer, axially extending rail 50 mounted on the ledge 44. The segment also includes a radial shank 52 extending radially inwardly from the rail 50 in a general T-configuration for supporting a radially inner seal 54 radially adjacent to a corresponding portion of the rotor 14.

In this embodiment, the rail 50 has forward and aft portions and bridges the corresponding forward and aft ledges 44 in the dovetail groove 48 for mounting the seal segment thereon in an otherwise conventional manner. The annular hanger 42 is typically formed in two 180 degree halves which are joined together along a horizontal flange of the turbine. This permits assembly of stator components in the corresponding halves of the turbine. The circumferentially arcuate rails 50 are typically inserted into an open circumferential end of the groove 48 to slide circumferentially into final position. In one embodiment, three seal segments of about 60 degrees each are mounted in each casing half, for a total of six seal segments circumferentially adjoining each other in the common hanger. The seal segments are thusly trapped both axially and radially in the hanger around the rotor.

In a conventional configuration, the seal segment is thusly trapped, and may include a backing spring in the groove 48 between the rail 50 and the surrounding hanger to occupy the small clearance provided therein. In this way, the radially inner seal 54 provides a stator component closely adjoining the rotor 14 for providing a seal therebetween to reduce leakage of the pressurized fluid 18 driven thereacross by a corresponding differential pressure between the forward side of the seal assembly in which the fluid has a first pressure P1, and the aft side of the seal assembly in which the fluid has a different second pressure P2. The differential pressure may be in any direction between the forward and aft sides of the seal assembly depending upon the specific location of the seal assembly in either the gas turbine engine or the steam turbine machine.

In either configuration, the high pressure fluid flows into the dovetail groove 48 and therefore exerts a corresponding radially inwardly directed force on the rail 50 for securely seating the rail on the supporting ledges 44. During operation, therefore, the high pressure fluid ensures that the seal segment is seated on the supporting ledges, and the intended configuration of the inner seal 54 with the rotor 14 is obtained.

In the exemplary configuration illustrated in FIG. 3, the inner seal 54 comprises a plurality of axially spaced apart labyrinth seal teeth extending radially inwardly from a common arcuate land. The labyrinth teeth may have any conventional configuration, and may be as few as one labyrinth tooth, but typically includes rows of teeth extending circumferentially along the arcuate extent of each seal segment, with the seal segments collectively providing full annular rows of the labyrinth seal teeth. The teeth are typically pointed or sharp for maximizing their sealing effectiveness, and provide a correspondingly small radial clearance or gap with the perimeter of the rotor 14.

The labyrinth seals of the type illustrated in FIG. 3 are ubiquitous in gas turbine engines and steam turbine machines, and are subject to undesirable tip rubs during transient operation of the corresponding rotors under orbiting thereof, or during differential thermal expansion and contraction movement between the rotor and the seal. In conventional practice, the radial gap between the seal teeth and the rotor is sufficiently large for reducing damage due to occasional tip rubs, but the larger radial clearance permits more flow leakage which decreases efficiency of the machine. And, the tip rubs dull the sharp ends of the labyrinth teeth and further decrease sealing efficiency and performance of the engine.

However, the seal assembly 24 illustrated in FIG. 3 is suitably modified in accordance with the present invention to provide active movement thereof during transient conditions to eliminate or reduce the possibility of undesirable tip rubs. More specifically, the seal assembly further includes an arcuate carrier 56 mounted radially between the hanger 42 and the outer rail 50 of the seal segment, and includes a lift button or piston 58 mounted in a blind cavity or bore 60.

Figure 4:
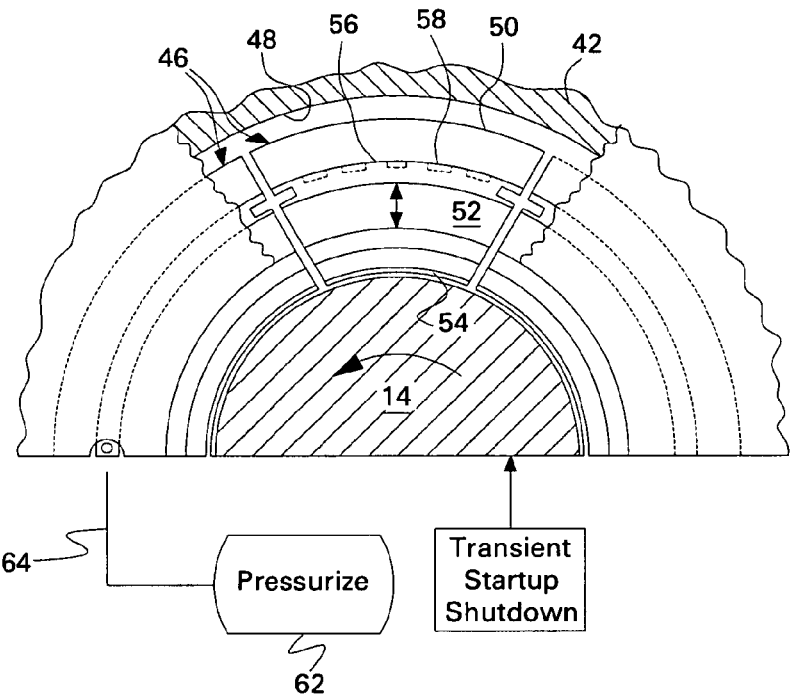
FIG. 4 is a radial sectional view of the seal assembly illustrated in FIG. 3 and taken along line 4—4.
Figure 5:
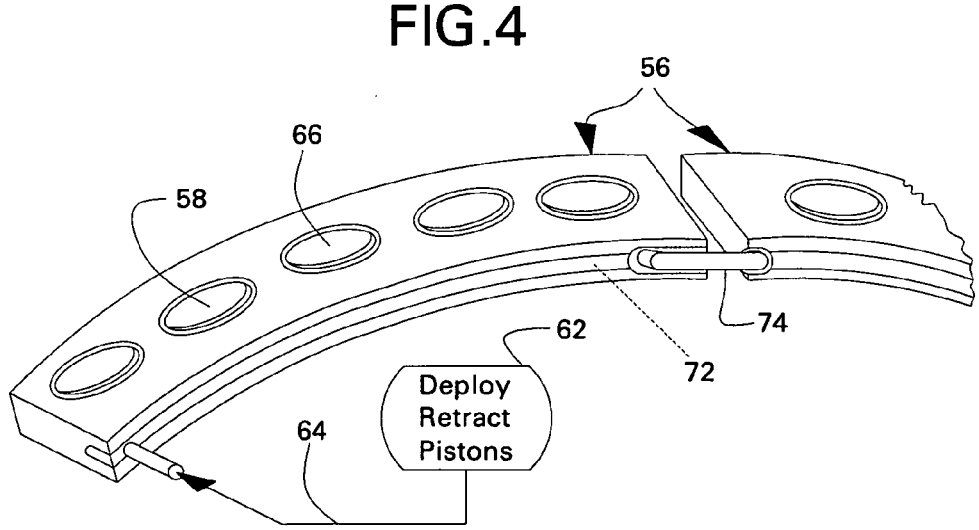
FIG. 5 is a isometric view of an arcuate carrier used in the seal assembly shown in FIGS. 3 and 4.
Figure 6:
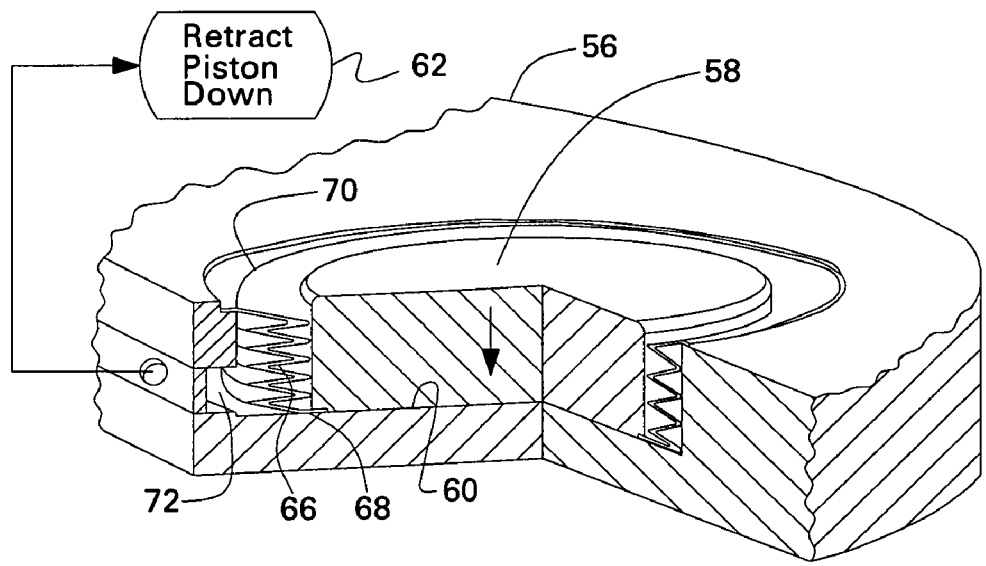
FIG. 6 is a partly sectional, isometric view of a retracted piston mounted in a bore in the carrier illustrated in FIG. 5 in accordance with an exemplary embodiment.
Figure 7:
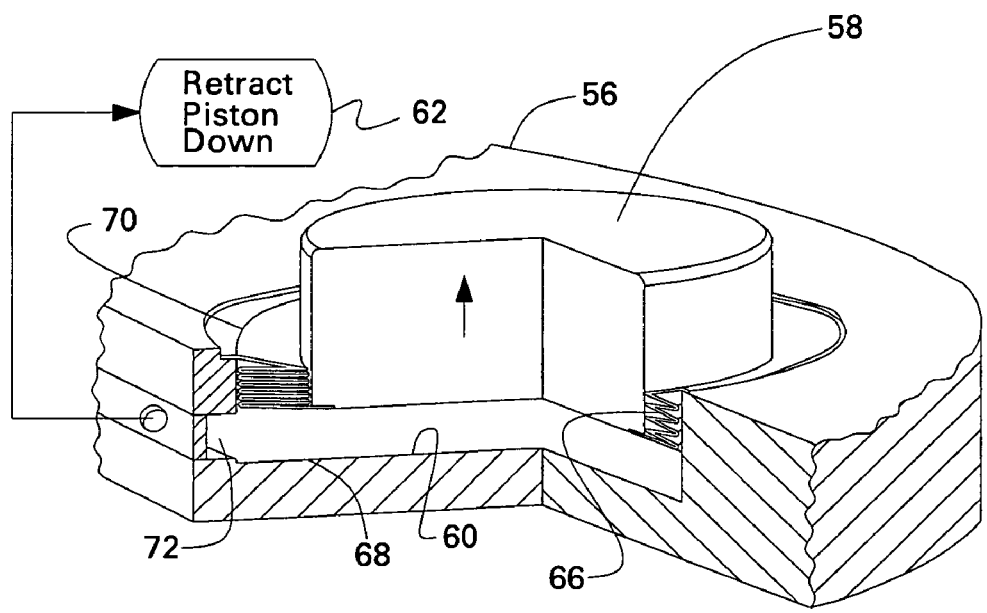
FIG. 7 is a partly sectional, isometric view, like FIG. 6, of the piston deployed under pressure in the carrier.

FIG. 4 illustrates three circumferentially adjoining seal segments 46 in one half of the turbine, with each seal segment having corresponding arcuate carriers 56 cooperating therewith. FIG. 5 illustrates exemplary carriers 56 in isolation. And, FIGS. 6 and 7 illustrate enlarged portions of the carrier including the pistons 58 mounted in their corresponding bores 60.

As illustrated in FIGS. 3–7, an actuator 62 (herein meaning at least one actuator) is provided for selectively pressurizing the bore 60 with a suitable pressurizing gas 64 to deploy the piston 58 between the hanger 42 and the rail 50, and thereby retract radially outwardly the entire seal segment 46. The actuator 62 may have any suitable form for pressure actuating the piston by providing thereto the pressurizing gas 64 under a suitably high pressure when desired, such as during transient operation of the turbine including start up and shutdown thereof. The piston may also be deployed during other transient conditions in which differential thermal expansion and contraction between the rotor and hanger would otherwise decrease the radial clearance between the seal and rotor, which is offset by temporarily retracting the seal segment radially outwardly.

The actuator 62 preferably includes pressurized gas in a storage bottle or canister, or provided from an accumulator storing the gas from a high pressure compressor. The gas may be air, or an inert gas such as argon or nitrogen, or any other suitable pressure fluid suitable for deploying the piston in the applicable configuration such as the gas turbine illustrated in FIG. 1, or the steam turbine illustrated in FIG. 2, or in other typical applications.

The actuator preferably also includes suitable conduits or pipes for channeling the gas in the turbine machines to the corresponding seal segments, which conduits are joined in flow communication with the corresponding carriers. Suitable valves are provided in the conduits for controlling flow of the pressurized gas, under the conventional computer control of the turbine. The valves permit selective flow of the pressurized gas to the carriers for deploying the pistons, and for venting the gas from the carriers to retract the pistons when desired. The various functions of the actuator 62 are illustrated schematically in the figures to correspond with the method of use thereof.

More specifically, the seal assembly illustrated in FIG. 3 may be introduced in a new design turbine, and may even be retrofit into existing turbines in available space of the corresponding rotor seals. The seal segment 46 is simply mounted around the corresponding portion of the rotor 14 in any conventional manner, but modified for the introduction of the actuating carriers 56. The actuator 62 is then operated for pressurizing the carrier bore 60 as the rotor rotates for deploying radially outwardly the piston 58, and thereby retracting radially outwardly the corresponding seal segment 46 as shown in phantom line in FIG. 3. As the pistons 58 are deployed radially outwardly they lift the rail 50 within the available space of the dovetail groove 48, which correspondingly lifts the inner seal 54 radially outwardly away from the rotor 14 for increasing the radial gap therebetween. In this way, orbiting or differential thermal movement of the rotor 14 will have more available radial space for preventing or limiting undesirable rubbing of the seal 54 itself.

As shown schematically in FIG. 4, the carrier bore 60 is preferably pressurized during transient rotation of the rotor typically occurring during start up or acceleration-to-speed of the rotor, or shutdown and deceleration of the rotor, or both. In start up and shutdown, the rotor passes through critical speeds or frequencies and experiences associated eccentric orbiting. In other transient operations of the applicable machine and its rotor, differential thermal expansion and contraction may occur between the rotor and seal segments supported in the hanger for which active retraction thereof is desirable, and during which the carrier may be pressurized for deploying the piston.

FIGS. 6 and 7 illustrate a preferred embodiment of mounting the piston 58 in the carrier 56. The piston 58 is preferably solid metal for maximizing its strength, and is sealingly mounted in the bore 60 by a suitable seal in the exemplary form of a tubular bellows 66. The bellows includes an inner end 68 sealingly joined to the piston 58, and an outer end 70 sealingly joined to a corresponding portion of the carrier 56 around the bore 60.

In a preferred embodiment the bellows is a compression bellows whose inner end 68 is welded to an inner end of the piston 58, and whose outer end 70 is welded to the carrier at an outer end of the bore 60 corresponding with the outer end of the piston 58. As shown in FIG. 6, the height of the piston 58 generally matches the depth of the bore 60 so that the piston is generally flush with the outer surface of the carrier when retracted in the bore. Correspondingly, the bellows 66 is normally relaxed at its full height with minimal loading and stress therein.

When the bore 60 is pressurized as illustrated in FIG. 7, the pressurized gas 64 applies a pressurization force over the lower surface of the piston 58 for deploying it outwardly from the carrier. Correspondingly, the bellows 66 is compressed under the pressurized gas and movement of the piston while sealing the gas inside the carrier. Since the bellows 66 must be suitably flexible for deploying and retracting the piston during operation, this preferred configuration thereof minimizes the stresses therein particularly when it is not deployed for ensuring durability and longevity thereof.

In the exemplary embodiment illustrated in FIGS. 3 and 4, the seal assembly includes a plurality of seal segments 46 adjoining circumferentially around the perimeter of the rotor, and corresponding pluralities of the forward and aft carriers 56 corresponding with the plural seal segments. The forward carriers circumferentially adjoin each other, and the aft carriers circumferentially adjoin each other in the manner illustrated in FIGS. 4 and 5 in corresponding flow communication therebetween provided by interconnecting conduits or pipes of the actuator 62. In this way, the pressurized gas may be channeled in series to each of the arcuate carriers mounted in a row atop the corresponding ledge portion.

The forward and aft carriers 56 illustrated in FIGS. 3–5 preferably each includes a plurality of the pistons 58 sealingly mounted in respective bores 60 by respective bellows 66. In this way, the deployment force may be spread circumferentially around the full annular extent of the adjoining seal segments 46 to overcome the differential pressure acting on the corresponding rails 50 thereof during operation.

Since the carriers 56 illustrated in FIGS. 3–5 are arcuate, they include a convex radially outer surface, and a corresponding concave radially inner surface. The bores 60 are preferably disposed through the carrier outer surface, with the carrier inner surface being imperforate. The pistons 58 are then disposed in the bores and extend radially outwardly from the corresponding floors thereof. In this way, the concave inner surface of the carriers illustrated in FIG. 3 remains in direct contact with the supporting ledges 44, while deployment of the several pistons 58 radially outwardly directly lifts the rail 50 for retracting the seal 54 away from the rotor. It is noted that as the rail 50 is retracted radially outwardly, the circumferential interface between the rail and the pistons increases in circumference, and therefore introduces circumferential friction loads between the pistons and the rail.

Since each carrier 56 preferably includes a plurality of the bores 60 spaced circumferentially apart, with each bore including a respective piston 58 sealed therein by the surrounding bellows 66, the circumferential friction forces are distributed among the several pistons. In order to reduce these friction forces, the multiple pistons are preferably grouped near the center of the carrier as illustrated in FIG. 5 leaving suitable space between the end pistons and the circumferential ends of the carriers.

Furthermore, the individual pistons 58 are made as large in diameter as possible within the limited space of the carrier for maximizing the deployment forces therefrom and reducing the tilting effect thereof due to the circumferential friction. The bellows 66 are necessarily flexible for permitting deployment of the pistons and are subject to additional stress due to any tilting of the individual pistons 58 as they are deployed. Accordingly, the bellows are suitably sized for sealing the piston in the carrier and reducing stresses therein during operation, while also permitting maximum size of the piston 58 in the limited space.

The arcuate carrier 56 illustrated in FIGS. 5–7 is preferably solid metal with corresponding bores 60 formed therein for receiving the respective pistons 58. The several bores 60 in each carrier may be suitably joined in flow communication with each other by introducing a common arcuate manifold 72 along one side or edge of the carrier. The manifold may be formed as a cut or recess along the side of the carrier and sealingly closed by a thin seal strip for providing flow continuity between the several bores. Correspondingly, suitable conduits 74 may interconnect the manifolds 72 of adjoining carriers for providing flow communication therebetween for channeling the pressurized gas thereto. In this way, the actuator 62 may channel the pressurized gas to one segment for series flow in turn to the adjoining seal segments for simultaneously deploying the pistons 58 therein.

Since a forward carrier is disposed between the rail 50 and forward ledge in FIG. 3, and an aft carrier is disposed between the same rail 50 and the aft ledge, the actuator 62 is suitably joined to both sets of forward and aft carriers for simultaneously deploying the pistons therein, and simultaneously retracting the several seal segments 46 supported on both ledges.

The size of the available ledges 44 and rail 50 limit the size of the side carriers and pistons which may be mounted therebetween. The collective surface area of the pistons and bellows determines the collective deployment force which may be used with a specific value of the pressurized gas. This two-ledge design of the retraction carriers may therefore be used at any seal location in which the actuation force provided by the collective pistons is sufficient to overcome the sum of the forces holding the seal assembly against the ledges 44, which forces include pressure loading, friction forces, and spring forces.

Figure 8:
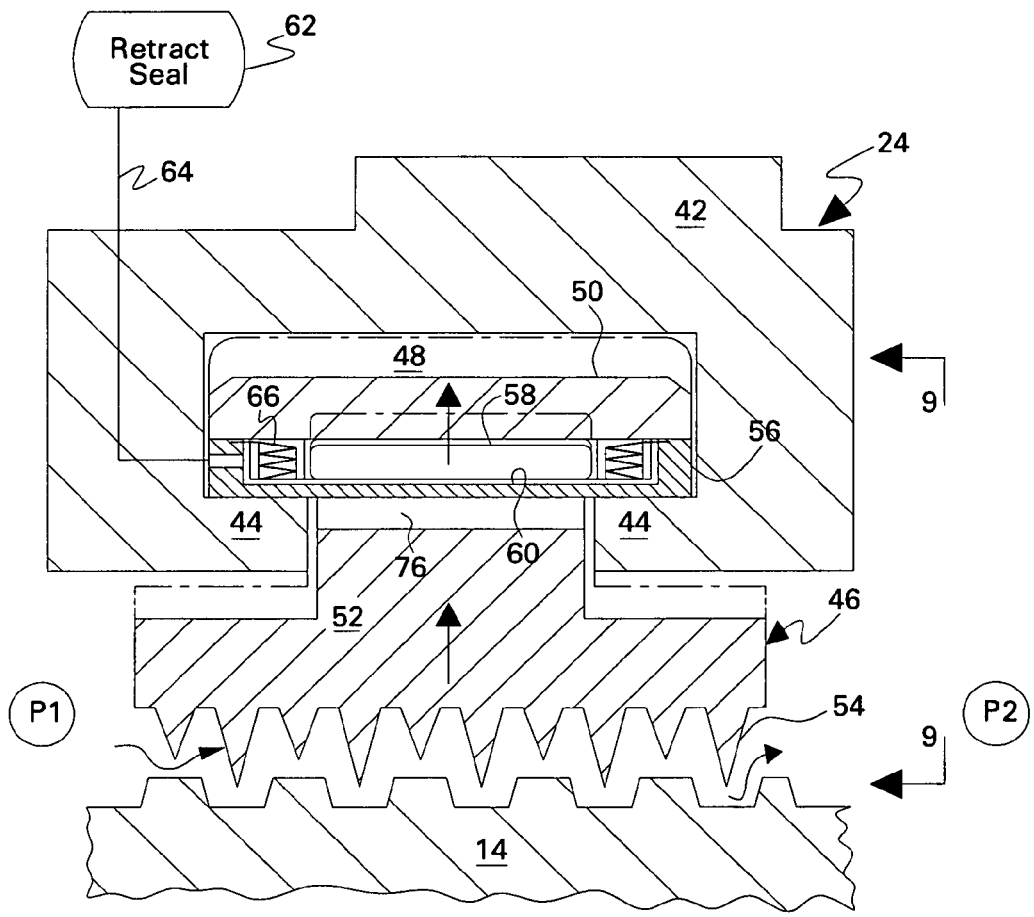
FIG. 8 is a elevational, axial sectional view, like FIG. 3, of a seal assembly in accordance with another embodiment for use in the gas turbine of FIG. 1 or the steam turbine of FIG. 2.
Figure 9:
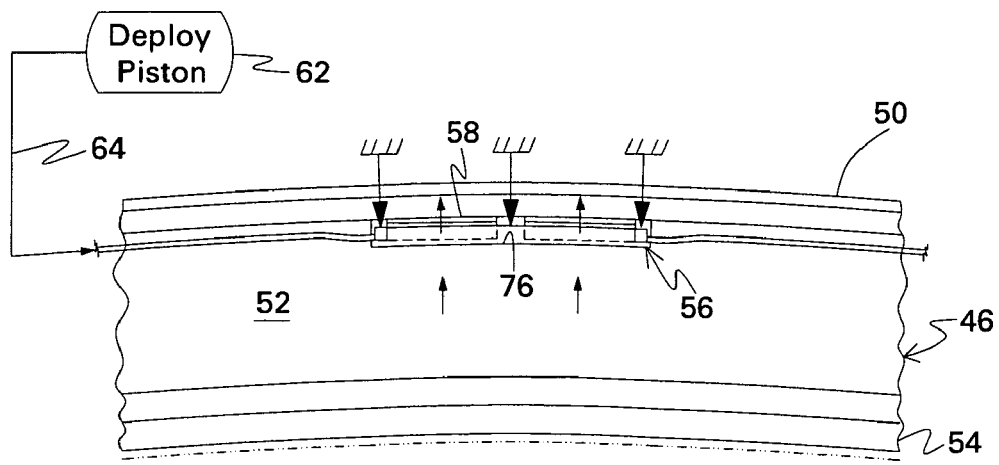
FIG. 9 is a elevational radial view of the seal segment illustrated in FIG. 8 in isolation and taken along line 9—9.
Figure 10:
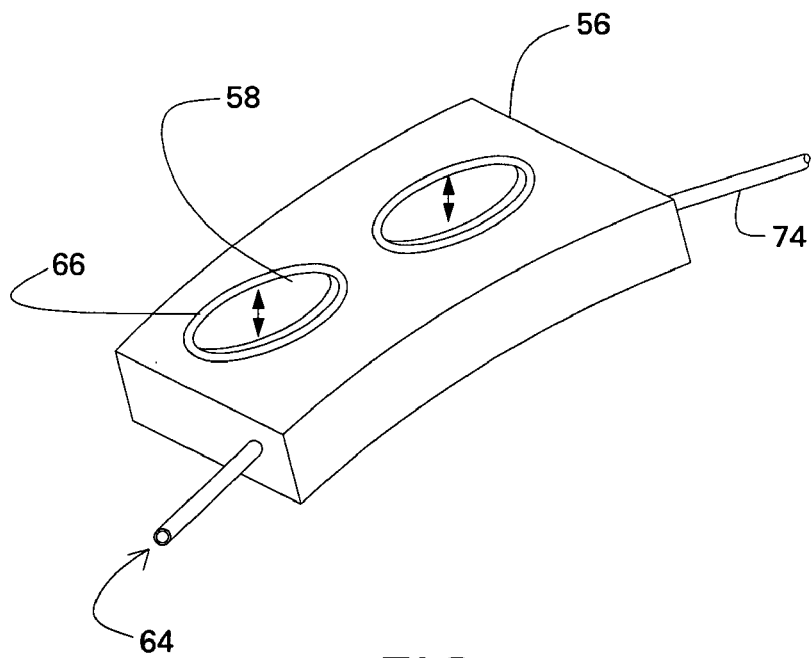
FIG. 10 is an isometric view of the piston carrier illustrated in FIGS. 8 and 9 in accordance with an exemplary embodiment.

Illustrated in FIGS. 8–10 is another embodiment of the seal assembly 24 including an axially larger carrier 56 mounted in a corresponding arcuate slot 76 extending axially through the shank 52 of the seal segment 46 directly below the rail 50. In this configuration, the carrier 56 extends completely through the seal segment to bridge both forward and aft ledges 44 when mounted thereon.

The wider carrier 56 bridges the forward and aft ledges 44 of the hanger to radially support the rail 50 thereatop. And, as shown in FIGS. 8 and 9, the slot 76 extends circumferentially along the seal segment and is radially larger in height than the carrier 56 to provide a suitable retraction clearance or gap in the shank directly below the carrier.

The carrier 56 illustrated in FIGS. 8–10 may be identical in configuration with the carrier illustrated in FIGS. 6 and 7, including the pistons 58 being sealingly mounted by the surrounding bellows 66 in the corresponding bores 60. However, the wider carrier permits the pistons 58 to have correspondingly larger diameters for increasing the deployment force effected thereby as the high pressure gas 64 acts across the larger inner surface of the piston 58. In this way, the wider carrier 56 illustrated in FIG. 8 may introduce correspondingly larger retraction force on the seal segment 46 within the limited space provided by the dovetail groove 48 and the small forward and aft ledges 44.

In FIG. 8, the piston 58 is illustrated retracted flush inside its carrier 56, with the seal segment 46 being seated on the ledges 44 in the radially innermost position. The actuator 62 illustrated in FIG. 8 may then be actuated for delivering the pressurized gas 64 into the carrier for retracting the seal segment radially outwardly as the piston 58 is deployed radially outwardly as shown in phantom line in FIG. 8, and in solid line in FIG. 9. As the piston is deployed radially outwardly it correspondingly lifts the outer rail 50 relative to the hanger ledges 44, which is permitted by the bottom clearance in the slot 76 through which the carrier is mounted.

In the embodiment illustrated in FIG. 4, the carrier may extend in length for the full circumferential length of the individual seal segment 46, and have a corresponding number of pistons 58 therein. However, in the FIG. 9 embodiment, the circumferential extent of the through-slot 76 must be suitably less than the circumferential length of the seal segment 46 for maintaining the structural integrity between the shank 52 and the supporting rail 50.

Corresponding, the circumferential length of the carrier 56 is limited to the length of the slot 76, and fewer, but larger pistons 58 may be introduced in the carrier. Since the carrier 56 is circumferentially shorter in the FIG. 9 embodiment than in the FIG. 4 embodiment, fewer pistons 58 may be used, and even a single piston 58 in the carrier might be used for low pressure seal applications. However, the fewer number of pistons are offset by their larger size and effective area upon which the high pressure gas 64 may be applied.

The exemplary embodiment of the carrier 56 illustrated in FIGS. 8–10 therefore includes two pistons 58 sealingly mounted in their respective bores 60 by corresponding bellows 66. The two-piston carrier 56 is preferably mounted in the seal segment 56 bridging the circumferential center thereof, and ensuring structural continuity between the shank 52 and the outer rail 50 at the two circumferential opposite ends thereof.

In an alternate embodiment, the center carrier 56 may have more pistons therein, or as little as one piston. In the one piston configuration of the center carrier, two or more such center carriers may be mounted in an individual seal segment through corresponding slots 76 provided therein for distributing circumferentially the actuation forces from the corresponding pistons 58.

Like the side carrier embodiment illustrated in FIG. 3, the center carrier embodiment illustrated in FIG. 8 enjoys the advantages of construction illustrated in FIGS. 6 and 7 including the introduction of the pistons 58 in the outer convex surface of the carrier 56. And, the inner seal 54 is similarly in the form of the labyrinth seal teeth spaced axially apart and extending circumferentially around the rotor.

In the embodiments illustrated in FIGS. 3 and 8, the rail 50 is mounted atop the shank 52 in a general T-shaped configuration forming a dovetail mounted in the hanger groove 48 atop both side ledges 44. The carrier 56 therefore may be mounted between the rail 50 and either one or both of the side ledges 44 depending upon the particular configuration.

Figure 11:
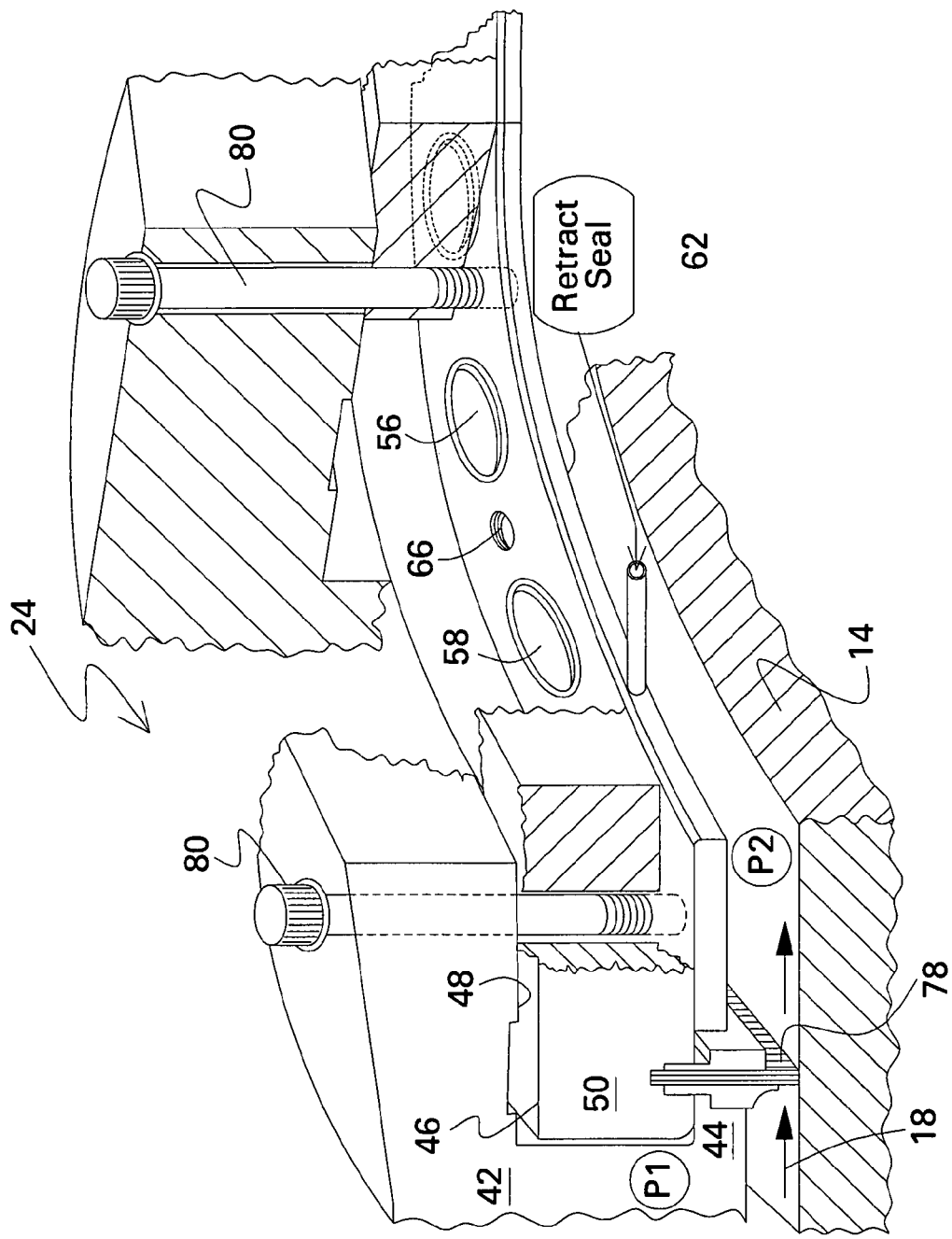
FIG. 11 is a partly sectional, isometric view of a seal assembly in accordance with another embodiment for use in the gas turbine of FIG. 1 or the steam turbine of FIG. 2.

FIG. 11 illustrates yet another embodiment of the seal assembly 24 in which the hanger 42 includes a single, forward ledge 44 defining the supporting groove 48, without an aft ledge. In this configuration, the rail 50 includes a forward portion directly mounted on the forward ledge 44 inside the groove 48. And, the rail 50 has an aft portion suspended therefrom.

In this exemplary configuration, the rail 50 supports a radially inwardly extending brush seal 78 including an array of bristles trapped between retention plates. This configuration of the seal assembly 24 is otherwise conventional for providing the brush seal 78 in direct rubbing contact with the rotor 14. However, this seal assembly may be modified in accordance with another embodiment of the present invention to mount the side carrier 56 directly under the aft portion of the rail 50 by a plurality of radially extending bolts 80 extending loosely through the rail and fixedly joined to the hanger 42.

In this embodiment, the bolts 80 are circumferentially spaced apart from each other and extend radially through corresponding clearance holes in the rail 50. The bolt heads are disposed atop hanger 42, with the threaded distal ends of the bolts threadingly engaging corresponding threaded holes disposed in the carrier 56 between corresponding ones of the pistons 58 mounted therein.

In this way, the carrier 56 is suspended below the aft portion of the rail 50 in abutment with the radially inner surface thereof and cooperates with the forward ledge 44 to support the seal segment 46 from the hanger 42.

During operation, pressurization of the carrier to deploy the pistons 58 raises the pistons 58 relative to the supporting bolts 80 and therefore retracts radially upwardly the seal segment 46 for increasing the radial distance from the rotor 14. In this way, loads on the bristles of the brush seal may be relieved, or the brush seal may be temporarily retracted away from the rotor for accommodating transient operation of the rotor which would otherwise damage or reduce the longevity of the brush seal.

This embodiment of the side carrier 56 illustrated in FIG. 11 may be substantially identical to the embodiments illustrated in FIGS. 5–7, except for including the threaded apertures therein for receiving the supporting bolts 80.

The various embodiments of the active seal assembly 24 described above commonly use carriers supporting pistons therein which may be conveniently deployed for retracting the seal segments when desired. The carrier may be configured for corresponding differences in the basic seal assembly 24 for use between the rail of the seal segments and the supporting hanger. The versatility of configuring and mounting the carriers on the sides of the rails or through the shanks suspended thereunder permit various modifications of the seal assembly. A single piston may be used in each carrier, or multiple pistons may be used in an individual carrier and ganged together for common deployment under pressure. Although the bellows seal is preferred for its high pressure, high temperature strength and cooperation with the piston, the piston may be otherwise sealed in the carrier in alternate embodiments.

The versatility provided by the carrier mounted pistons permits their use in the various rotor seals found in conventional gas turbine engines and steam turbine machines. The seal assemblies may simply be correspondingly modified for use at the various locations, and subject to the specific differential pressure experienced thereat. The higher the differential pressure of the pressurized fluid 18 across the seal assembly, the more actuation force will be necessary from the pistons.

And, during operation the pistons may be conveniently deployed for temporarily retracting the seal segments radially outwardly for increasing their radial spacing from the rotor. Venting the pressurized gas from the carriers correspondingly retracts the pistons into their bores, and permits deployment of the seal segments to their normally radially inner positions.

A particular benefit of this simple retraction system is the failsafe operation in which the seal segments remain in their radially inner position with the rails seated upon the supporting ledges when the pistons are retracted and no pressurized gas is provided thereto. In this way, the seals are located closely adjacent to the rotor in their normal position whether or not the carrier is operational. The turbine therefore operates normally with normal efficiency.

However, a particular benefit of the active seal assembly is the ability to retract the seal segments during transient operation to minimize rubbing damage thereto which would otherwise occur without retraction thereof. In this way, efficiency of the turbine may be improved over the useful life thereof, and between normal maintenance outages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A seal assembly comprising:
   an annular hanger including a supporting ledge;
   an arcuate seal segment including a radially outer rail mounted on said ledge and supporting a radially inner seal;
   an arcuate carrier mounted between said hanger and said rail, and including a piston mounted in a bore, a tubular bellows having an inner end joined to said piston, and an outer end joined to said carrier around said bore; and
   an actuator for pressurizing said bore to deploy said piston between said hanger and said rail and retract said seal segment.

2. A seal assembly according to claim 1 further comprising:
   a plurality of said seal segments mounted on said ledge; and
   each of said segments includes a corresponding carrier having a piston mounted in a bore and collectively joined to said actuator for simultaneously retracting said seal segments.

3. A seal assembly according to claim 2 wherein:
   each of said carriers includes a convex outer surface;
   said bores are disposed through said convex outer surfaces; and
   said pistons extend radially outwardly in said bores.

4. A seal assembly according to claim 3 wherein:
   said hanger further includes forward and aft ledges spaced axially apart to define a supporting groove;
   each of said seal segments further includes a shank extending inwardly from said rail for supporting said inner seal, and said rail bridges said forward and aft ledges in said groove for mounting said seal segments thereon; and
   said carriers are mounted between said rail and at least one of said ledges.

5. A seal assembly according to claim 4 further comprising:
   a plurality of forward carriers disposed between said forward ledge and said rail, and including a piston sealingly mounted in a bore by a surrounding bellows;
   a plurality of aft carriers disposed between said aft ledge and said rail, and each including a piston sealingly mounted in a bore by a surrounding bellows; and
   said actuator are joined to both carriers for deploying said pistons therein and simultaneously retracting said seal segments on both ledges.

6. A seal assembly according to claim 5 wherein:
   each of said forward carriers includes a plurality of said pistons sealingly mounted in respective bores by respective bellows; and
   each of said aft carriers includes a plurality of said pistons sealingly mounted in respective bores by respective bellows.

7. A seal assembly according to claim 4 wherein:
   each seal segment further includes a shank extending radially inwardly from said rail;
   said shank includes an arcuate slot extending axially therethrough below said rail; and
   said carriers are mounted in said slots between said rail and both said ledges.

8. A seal assembly according to claim 7 wherein:
   said carriers bridge said forward and aft ledges to radially support said rail thereatop; and
   said slots are radially larger than said carriers to provide corresponding retraction clearances in said shanks below said carriers.

9. A seal assembly according to claim 3 wherein:
   said hanger includes a single forward ledge defining a supporting groove;
   said rail includes a forward portion mounted on said ledge, and an aft portion suspended therefrom;
   said carriers are suspended below said rail aft portion by a plurality of bolts extending through clearance holes in said rail and fixedly joined to said hanger;
   said carriers include convex outer surfaces;
   said bores are disposed through said convex outer surfaces; and
   said pistons extend radially outwardly in said bores.

10. A seal assembly according to claim 3 wherein said inner seal comprises a plurality of spaced apart labyrinth seal teeth or a brush seal.

11. A seal assembly comprising:
an annular hanger including a supporting ledge;
an arcuate seal segment including a radially outer rail mounted on said ledge and supporting a radially inner seal;
an arcuate carrier mounted between said hanger and said rail, and including a piston mounted in a bore; and
an actuator for pressurizing said bore to deploy said piston between said hanger and said rail and retract said seal segment.

12. A seal assembly according to claim 11 further comprising a tubular bellows sealingly joining said piston to said carrier around said bore.

13. A seal assembly according to claim 12 wherein said bellows includes an inner end joined to said piston, and an outer end joined to said carrier around said bore.

14. A seal assembly according to claim 13 wherein said bellows inner end is joined to an inner end of said piston, and said bellows outer end is joined to said carrier at an outer end of said bore.

15. A seal assembly according to claim 13 wherein:
said carrier includes a convex outer surface;
said bore is disposed through said convex outer surface; and
said piston extends radially outwardly in said bore.

16. A seal assembly according to claim 13 wherein said carrier includes a plurality of said bores spaced circumferentially apart, and each includes a piston sealed therein by a surrounding bellows.

17. A seal assembly according to claim 16 wherein:
said carrier further includes a manifold joining together said bores; and
said actuator is joined in flow communication with said manifold for simultaneously pressurizing said bores to simultaneously deploy said pistons.

18. A seal assembly according to claim 13 further comprising:
a plurality of said seal segments mounted on said ledge; and
each of said segments includes a corresponding carrier having a piston mounted in a bore and collectively joined to said actuator for simultaneously retracting said seal segments.

19. A seal assembly according to claim 13 wherein:
said hanger further includes forward and aft ledges spaced axially apart to define a supporting groove;
said seal segment further includes a shank extending inwardly from said rail for supporting said inner seal, and said rail bridges said forward and aft ledges in said groove for mounting said seal segment thereon; and
said carrier is mounted between said rail and at least one of said ledges.

20. A seal assembly according to claim 19 further comprising:
a forward carrier disposed between said forward ledge and said rail, and including a piston sealingly mounted in a bore by a surrounding bellows;
an aft carrier disposed between said aft ledge and said rail, and including a piston sealingly mounted in a bore by a surrounding bellows; and
said actuator is joined to both carriers for deploying said pistons therein and simultaneously retracting said seal segment on both ledges.

21. A seal assembly according to claim 20 further comprising:
a plurality of said seal segments adjoining circumferentially;
a plurality of said forward and aft carriers corresponding with said seal segments; and
said forward carriers circumferentially adjoin each other in flow communication, and said aft carriers circumferentially adjoin each other in flow communication.

22. A seal assembly according to claim 21 wherein:
each of said forward carriers includes a plurality of said pistons sealingly mounted in respective bores by respective bellows; and
each of said aft carriers includes a plurality of said pistons sealingly mounted in respective bores by respective bellows.

23. A seal assembly according to claim 22 wherein:
said forward and aft carriers each include a convex outer surface;
said bores are disposed through said convex outer surfaces; and
said pistons extend radially outwardly in said bores.

24. A seal assembly according to claim 23 wherein said inner seal comprises a plurality of spaced apart labyrinth seal teeth.

25. A seal assembly according to claim 19 wherein:
said seal segment further includes a shank extending radially inwardly from said rail;
said shank includes an arcuate slot extending axially therethrough below said rail; and
said carrier is mounted in said slot between said rail and both said ledges.

26. A seal assembly according to claim 25 wherein:
said carrier bridges said forward and aft ledges to radially support said rail thereatop; and
said slot is radially larger than said carrier to provide a retraction clearance in said shank below said carrier.

27. A seal assembly according to claim 26 wherein said carrier further includes a plurality of said pistons sealingly mounted in respective bores by respective bellows.

28. A seal assembly according to claim 27 wherein:
said carrier includes a convex outer surface;
said bores are disposed through said convex outer surface; and
said pistons extend radially outwardly in said bores.

29. A seal assembly according to claim 28 wherein said inner seal comprises a plurality of spaced apart labyrinth seal teeth.

30. A seal assembly according to claim 13 wherein:
said hanger includes a single forward ledge defining a supporting groove;
said rail includes a forward portion mounted on said ledge, and an aft portion suspended therefrom; and
said carrier is suspended under said rail aft portion by bolts extending through said rail and fixedly joined to said hanger.

31. A seal assembly according to claim 30 wherein:
said bolts are circumferentially spaced apart, and extend radially through clearance holes in said rail;
said carrier includes a convex outer surface;
said bore is disposed through said convex outer surface; and
said piston extends radially outwardly in said bore to abut a radially inner surface of said rail.

32. A method of using said seal assembly according to claim 13 comprising:
mounting said seal segment around a rotor; and
pressurizing said bore as said rotor rotates to deploy said piston and retract said seal segment radially outwardly from said rotor.

33. A method according to claim 32 further comprising pressurizing said bore during transient rotation of said rotor.

34. A method according to claim 33 wherein said bore is pressurized during startup of said rotor.

35. A method according to claim 33 where said bore is pressurized during shutdown of said rotor.

* * * * *